(12) United States Patent
Lee et al.

(10) Patent No.: US 10,931,184 B2
(45) Date of Patent: Feb. 23, 2021

(54) RESOLVER

(71) Applicant: LS AUTOMOTIVE TECHNOLOGIES CO., LTD., Gyeonggi-Do (KR)

(72) Inventors: Seong-Wook Lee, Gyeonggi-do (KR); Byung-Cheol Na, Gyeonggi-Do (KR); Da-Hee Sim, Gyeonggi-do (KR); Won-Yong Lee, Seoul (KR); Yeon-Muk Choi, Gyeonggi-do (KR)

(73) Assignee: LS AUTOMOTIVE TECHNOLOGIES CO., LTD., Gyeonggi-Do (KR)

( * ) Notice: Subject to any disclaimer, the term of this patent is extended or adjusted under 35 U.S.C. 154(b) by 269 days.

(21) Appl. No.: 15/770,846

(22) PCT Filed: Dec. 29, 2015

(86) PCT No.: PCT/KR2015/014438
§ 371 (c)(1),
(2) Date: Apr. 25, 2018

(87) PCT Pub. No.: WO2017/082465
PCT Pub. Date: May 18, 2017

(65) Prior Publication Data
US 2018/0316253 A1    Nov. 1, 2018

(30) Foreign Application Priority Data

Nov. 11, 2015  (KR) .................. 10-2015-0158174

(51) Int. Cl.
*H02K 24/00*    (2006.01)
*H02K 11/00*    (2016.01)
(Continued)

(52) U.S. Cl.
CPC ............... *H02K 24/00* (2013.01); *G01B 7/30* (2013.01); *G01D 5/20* (2013.01); *G01D 5/245* (2013.01);
(Continued)

(58) Field of Classification Search
CPC .... G01B 7/30; H02K 2213/03; H02K 11/225; H02K 24/00; G01D 5/20; G01D 5/245
See application file for complete search history.

(56) References Cited

U.S. PATENT DOCUMENTS

2005/0023921 A1* 2/2005 Kobayashi ............. H02K 24/00
310/168
2005/0040816 A1* 2/2005 Ando .................... G01D 5/2046
324/207.25
(Continued)

FOREIGN PATENT DOCUMENTS

JP    S60-141674 U    9/1985
JP    08-178611        7/1996
(Continued)

OTHER PUBLICATIONS

Suganuma, Machine Translation of JP2007051909, Mar. 2007 (Year: 2007).*

(Continued)

*Primary Examiner* — Quyen P Leung
*Assistant Examiner* — Eric Johnson
(74) *Attorney, Agent, or Firm* — Harness, Dickey & Pierce, P.L.C.

(57) ABSTRACT

Disclosed is a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein an area ratio (Ar/As) between the stator and (Continued)

the rotor satisfies Equation 1 below to prevent magnetic saturation of the resolver, improve measurement precision and reduce manufacture costs without increasing a size or weight of the resolver:

$$0.22 \leq Ar/As \leq 0.37 \qquad \text{Equation 1}$$

where As represents a sectional area of the stator, and Ar represents a sectional area of the rotor.

9 Claims, 10 Drawing Sheets (51) Int. Cl.
  *G01D 5/245* (2006.01)
  *G01D 5/20* (2006.01)
  *G01B 7/30* (2006.01)
  *H02K 11/225* (2016.01)
  *H02K 1/14* (2006.01)
  *H02K 1/27* (2006.01)

(52) U.S. Cl.
  CPC ........... *H02K 11/225* (2016.01); *H02K 1/146* (2013.01); *H02K 1/278* (2013.01); *H02K 2213/03* (2013.01)

(56) References Cited

U.S. PATENT DOCUMENTS

| | | |
|---|---|---|
| 2005/0122097 A1 | 6/2005 | Kitazawa |
| 2008/0079327 A1* | 4/2008 | Makino ................ B62D 5/0403 310/168 |
| 2017/0219385 A1* | 8/2017 | Qin ........................ G01D 5/204 |

FOREIGN PATENT DOCUMENTS

| | | | |
|---|---|---|---|
| JP | 2005-49183 A | | 2/2005 |
| JP | 2007051909 A | * | 3/2007 |
| JP | 2011-247774 A | | 12/2011 |
| JP | 2012-163359 A | | 8/2012 |
| KR | 20-1991-0003919 | | 6/1991 |
| KR | 10-0771035 B1 | | 10/2007 |
| KR | 10-2014-0127067 A | | 11/2014 |

OTHER PUBLICATIONS

Moog Component Group, "Synchro and Resolver Engineering Handbook", 2004 (Year: 2004).*
International Search Report from corresponding PCT Application No. PCT/KR2015/014438, dated Aug. 11, 2016, and it's English translation.

* cited by examiner

| Area ratio Ar/As [%] | Maximum measurement error [absolute degree] | Area ratio Ar/As [%] | Maximum measurement error [absolute degree] |
|---|---|---|---|
| 5 | 1.344 | 26 | 0.304 |
| 6 | 1.183 | 27 | 0.361 |
| 7 | 1.158 | 28 | 0.269 |
| 8 | 1.263 | 29 | 0.213 |
| 9 | 1.157 | 30 | 0.276 |
| 10 | 1.092 | 31 | 0.291 |
| 11 | 0.964 | 32 | 0.35 |
| 12 | 0.904 | 33 | 0.46 |
| 13 | 0.899 | 34 | 0.286 |
| 14 | 0.891 | 35 | 0.447 |
| 15 | 0.733 | 36 | 0.362 |
| 16 | 0.685 | 37 | 0.438 |
| 17 | 0.732 | 38 | 0.582 |
| 18 | 0.674 | 39 | 0.68 |
| 19 | 0.794 | 40 | 0.626 |
| 20 | 0.692 | 41 | 0.723 |
| 21 | 0.595 | 42 | 0.778 |
| 22 | 0.453 | 43 | 0.734 |
| 23 | 0.372 | 44 | 0.987 |
| 24 | 0.399 | 45 | 0.937 |
| 25 | 0.306 | 46 | 1.002 |

RESOLVER

CROSS-REFERENCE TO RELATED APPLICATIONS

This application is a National Phase application of PCT Application No. PCT/KR2015/014438, filed on Dec. 29, 2015, which claims the benefit and priority to Korean Patent Application No. 10-2015-0158174, filed Nov. 11, 2015. The entire disclosures of the applications identified in this paragraph are incorporated herein by references.

TECHNICAL FIELD

The present disclosure relates to a resolver, and more particularly, to a resolver for measuring a rotation angle and a rotation speed of a rotating device such as a motor.

BACKGROUND

Generally, a resolver is a kind of sensor for measuring a rotation angle and a rotation speed of a rotating device such as a motor. Recently, the resolver is widely used in various technical fields, particularly to a high-precision control system such as an electric power steering system which demands measurement and control of a rotation angle and a rotation speed with high precision. Therefore, it is needed to accurately figure out and analyze various factors giving an influence on the measurement performance of the resolver and reflect these factors on the design of the resolver in order to minimize a measurement error of the resolver and improve the measurement precision to the maximum.

However, in existing techniques, it is just intended to improve the measurement performance by changing configurations of an excitation coil and an output coil disposed at a stator of a resolver as disclosed in Japanese Unexamined Patent Publication No. 1996-178611, or it is just intended to improve the measurement performance by changing a shape of a rotor of a resolver as disclosed in Japanese Unexamined Patent Publication No. 2005-49183, so an area relation between the stator and the rotor is not considered as a factor giving an influence on the measurement performance of the resolver. In other words, if a rotor is designed to have an area smaller or greater than a certain level in comparison to the area of the stator, a magnetic flux path is concentrated toward the stator or the rotor, or a magnetic saturation is generated to disturb a flow of the magnetic flux, thereby deteriorating the measurement performance of the resolver. However, in existing techniques, this drawback is not reflected on the design of the resolver.

Further, in existing techniques, it is not proposed to optimize an area relation between the stator and the rotor in a simple way and reflect the area relation on the design of the resolver to facilitate the resolver designing work.

DISCLOSURE

Technical Problem

The present disclosure is designed to solve the problems of the related art, and therefore the present disclosure is directed to providing a resolver which may improve measurement precision, reduce manufacture costs and facilitate a design work of a developer by preventing magnetic saturation without unnecessarily increasing a size or weight of the resolver.

Technical Solution

In one aspect of the present disclosure, there is provided a resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein an area ratio (Ar/As) between the stator and the rotor satisfies Equation 1 below:

$$0.22 \leq Ar/As \leq 0.37 \qquad \text{Equation 1}$$

where As represents a sectional area of the stator, and Ar represents a sectional area of the rotor.

In an embodiment, the stator may have a ring shape, and a sectional area (As) of the stator may be defined using Equation 2 below:

$$As = \pi(a/2)^2 - \pi(b/2)^2 \qquad \text{Equation 2}$$

where As represents a sectional area of the stator, a represents a maximum outer diameter of the stator, and b represents a minimum inner diameter of the stator.

In an embodiment, the stator may include a back yoke having a ring-shaped body, and a plurality of teeth and a plurality of slots alternately formed at an inner circumference of the back yoke, and the excitation coil or the output coil may be wound on the teeth and accommodated in the slots.

In an embodiment, the teeth may respectively include a front end having a T shape, and a support portion protruding on the inner circumference of the back yoke to support the front end, the excitation coil or the output coil being wound on the support portion.

In an embodiment, the maximum outer diameter (a) of the stator may be defined as an outer diameter of the back yoke, and the minimum inner diameter (b) of the stator may be defined as a diameter of a circle formed by connecting terminals of the plurality of teeth.

In an embodiment, a sectional area (Ar) of the rotor may be defined using Equation 3 below:

$$Ar = \pi(c/2)^2 - \pi(d/2)^2 \qquad \text{Equation 3}$$

where Ar represents a sectional area of the rotor, c represents a maximum outer diameter of the rotor, and d represents a minimum inner diameter of the rotor.

In an embodiment, the rotor may include a ring-shaped body having a center hole into which the rotary shaft is inserted, and a plurality of salient poles formed at an outer circumference of the ring-shaped body.

In an embodiment, the salient pole may have an arc shape with a curvature radius smaller than at least a curvature radius of the rotor.

In an embodiment, the maximum outer diameter (c) of the rotor may be defined as a diameter of a circle formed by connecting peak points of the plurality of salient poles, and the minimum inner diameter (d) of the rotor may be defined as a diameter of the center hole.

In an embodiment, the rotor or the stator may be a steel plate laminate formed by laminating magnetic steel plates of a predetermined thickness.

In an embodiment, the rotor may be compressively inserted into an end of a shaft of a motor assembled to an electric power steering device.

In an embodiment, the maximum outer diameter of the stator may be in the range of 15 mm to 280 mm.

Advantageous Effects

According to the present disclosure, since an area relation between a stator and a rotor is optimized in designing a resolver, it is possible to prevent magnetic saturation of the resolver, improve measurement precision and reduce manufacture costs without unnecessarily increasing a size or weight of the resolver.

In addition, since an area of the stator and an area of the rotor are calculated as approximate values and a numerical range for optimizing an area ratio between the stator and the rotor is provided to be reflected on the design of the resolver, it is possible to facilitate a design work for the resolver and prevent a design error.

Further, it would be obviously understood from the following description by those skilled in the art that the embodiments according to the present disclosure can also solve various technical objects not mentioned above.

BEST MODE

Hereinafter, embodiments of the present disclosure will be described in detail with reference to the accompanying drawings in order to clearly explain solutions to the technical objects of the present disclosure. However, in the present disclosure, any explanation of the prior art may be omitted if it is regarded to render the subject matter of the present disclosure vague. Also, the terms used herein are defined in consideration of functions in the present disclosure and can be varied depending on the intention of a designer, a manufacturer or the like or according to custom. Therefore, the terms should be defined based on the overall disclosure of the specification.

Figure 1:
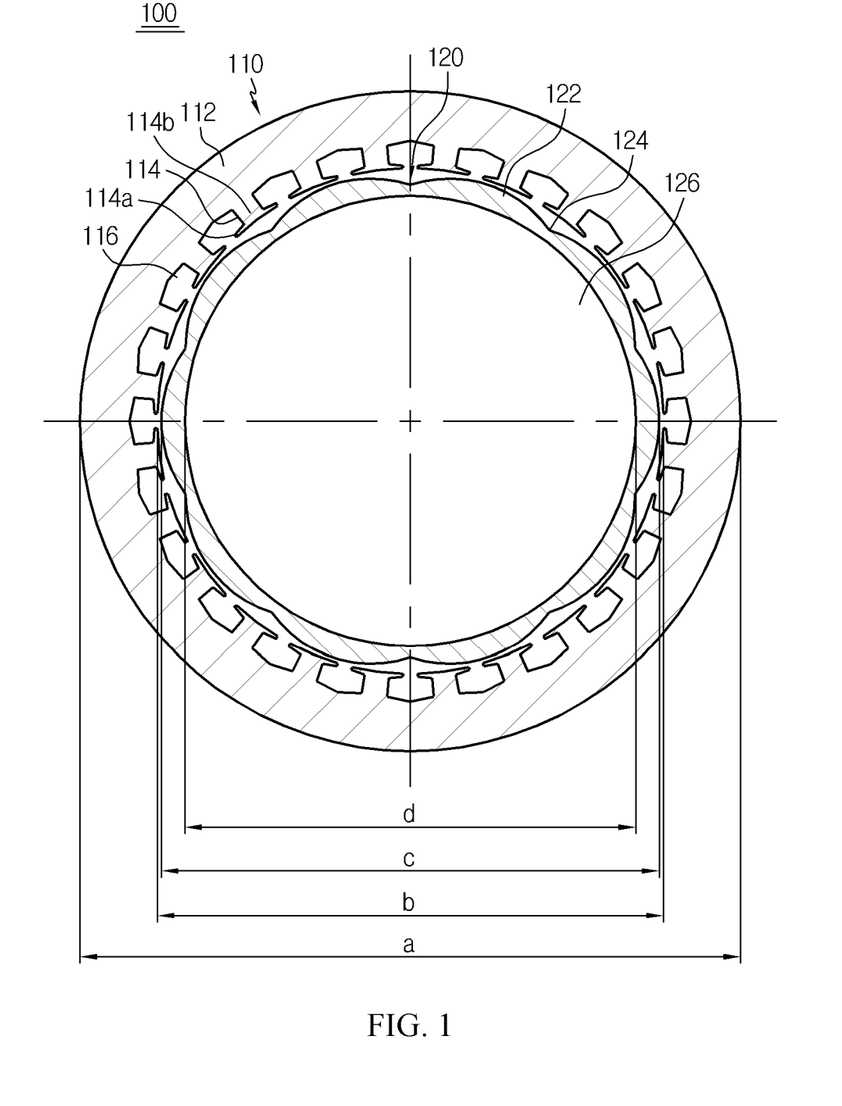
FIG. 1 is a cross-sectional view showing a resolver according to an embodiment of the present disclosure.

FIG. 1 is a cross-sectional view showing a resolver according to an embodiment of the present disclosure.

As shown in FIG. 1, a resolver 100 includes a stator 110 and a rotor 120. The stator 110 has an annular structure as a whole, and at least one excitation coil (not shown) and at least one output coil (not shown) are disposed at an inner circumference of the resolver 100. Recently, a stator 110 having a one-phase excitation coil and two-phase output coils is widely used. This stator 110 may include a back yoke 112 forming a ring-shaped body of the stator 110 and a plurality of teeth 114 formed at an inner circumference of the back yoke 112. Between teeth of the stator 110, a slot 116 is formed to accommodate a coil, and the excitation coil and the output coil are respectively wound on the teeth 114 and accommodated in the slots 116. In this case, the teeth 114 of the stator 110 may respectively include a front end 114a having a T shape, and a support portion 114b protruding on the inner circumference of the back yoke 112 to support the front end 114a, so that an excitation coil or an output coil is wound thereon.

The rotor 120 has a shape corresponding to the stator 110, and the rotor 120 is disposed at a center space in the stator 110 with a predetermined gap from the stator 110 to rotate based on a rotary shaft. In this case, the rotor 120 cooperates with the stator 110 to change a gap permeance with respect to the stator 110. For this, the rotor 120 may include a ring-shaped body having a center hole 126 into which the rotary shaft is inserted, a plurality of salient poles 122 formed at an outer circumference of the ring-shaped body, and a connection unit 124 for connecting the salient poles to each other. For example, when the resolver is applied to an electric power steering device, the rotor 120 may be compressively inserted through the center hole 126 into an end of a shaft of a motor assembled to the electric power steering device. In addition, the stator 110 or the rotor 120 may be made of a steel plate laminate formed by laminating a plurality of ferromagnetic steel plates of a predetermined thickness or formed with a single ferromagnetic steel plate of a predetermined thickness.

Meanwhile, if an excitation voltage is applied to the excitation coil disposed at the stator 110 and the rotor 120 is rotated by means of the rotary shaft coupled to the center hole 126, the rotor 120 changes a gap permeance with respect to the stator 110 by means of the salient pole 122 and the connection unit 124. As a result, voltage signals of sin and cos waveforms are output through the output coil of the stator 110. The resolver 100 measures a rotation angle, a rotation speed or the like of the rotary shaft by using these output signals.

In this case, if the stator 110 is designed to have an area seriously greater or smaller than an area of the rotor 120 on the basis of a section orthogonal to the rotary shaft, namely a cross section, a magnetic flux path is concentrated to any one of the stator 110 and the rotor 120 to cause an excessively crowded magnetic flux or generate magnetic saturation, thereby disturbing a flow of the magnetic flux, and as a result, the measurement performance of the resolver deteriorates.

Therefore, in the resolver 100 according to the present disclosure, an area ratio between the stator 110 and the rotor 120 is optimized. In other words, in the resolver 100 according to an embodiment of the present disclosure, a ratio (Ar/As) of a rotor area (Ar) to a stator area (As) is in the range of 0.22 to 0.37. Namely, in the resolver 100 according to an embodiment of the present disclosure, the ratio (Ar/As) of the rotor area (Ar) to the stator area (As) is defined as in Equation 1 below.

$$0.22 \leq Ar/As \leq 0.37 \qquad \text{Equation 1}$$

where As represents a stator area, and Ar represents a rotor area.

In this case, the stator area (As) is defined as in Equation 2 below.

$$As = \pi(a/2)^2 - \pi(b/2)^2 \qquad \text{Equation 2}$$

where As represents a stator area, a represents a maximum outer diameter of the stator, and b represents a minimum inner diameter of the stator.

In other words, the stator area (As) may be calculated by subtracting an area of a circle whose diameter is identical to the minimum inner diameter (b) of the stator 110 from an area of a circle whose diameter is identical to the maximum outer diameter (a) of the stator 110. At this time, the stator 110 may include a back yoke 112 having a ring-shaped body, and a plurality of teeth 114 and a plurality of slots 116 alternately formed at an inner circumference of the back yoke 112. In this case, the maximum outer diameter (a) of the stator 110 may be defined as the maximum outer diameter of the back yoke 112. At this time, the maximum outer diameter (a) of the stator 110 may be set based on the outer circumference of the back yoke 112, which is located at an outermost side from the center point, but a portion having no relation with a main function of the stator 110, for example a protrusion for screwing with a relatively smaller area, is not included in the outer diameter of the stator 110.

In addition, the minimum inner diameter (b) of the stator 110 may be defined as a diameter of a virtual circle formed by connecting terminals of the plurality of teeth 114. For example, the minimum inner diameter (b) of the stator 110 may correspond to a shortest distance between both teeth located at opposite sides based on the center point of the stator 110.

Meanwhile, the rotor area (Ar) is defined as in Equation 3 below.

$$Ar = \pi(c/2)^2 - \pi(d/2)^2 \qquad \text{Equation 3}$$

where Ar represents a rotor area, c represents a maximum outer diameter of the rotor, and d represents a minimum inner diameter of the rotor.

In other words, the rotor area (Ar) may be calculated by subtracting an area of a circle whose diameter is identical to the minimum inner diameter (d) of the rotor 120 from an area of a circle whose diameter is identical to the maximum outer diameter (c) of the rotor 120. If the rotor 120 includes a ring-shaped body having a center hole 126 into which the rotary shaft is inserted and a plurality of salient poles 122 formed at an outer circumference of the ring-shaped body and also the plurality of salient poles 122 has an arc shape with a curvature radius smaller than a curvature radius of the rotor 120, the maximum outer diameter (c) of the rotor 120 may be defined as a diameter of a virtual circle formed by connecting peak points of the plurality of salient poles 122. For example, the maximum outer diameter (c) of the rotor 120 may correspond to a linear distance between peak points of both salient poles located at opposite sides based on the center point of the rotor 120.

In addition, the minimum inner diameter (d) of the rotor 120 may be defined as an inner diameter of the center hole 126. At this time, the minimum inner diameter (d) of the rotor 120 may be set based on an inner circumference which is located closest from the center point, but a portion having no relation with a main function of the rotor 120, for example a protrusion or groove for coupling the rotary shaft with a relatively smaller area, is not included in the inner diameter of the rotor 120.

An area ratio (Ar/As) of the stator 110 and the rotor 120 of the resolver 100 according to an embodiment of the present disclosure may be expressed as in Equation 4 below on the basis of Equations 1 and 2.

$$0.22 \leq (c^2-d^2)/(a^2-b^2) \leq 0.37 \qquad \text{Equation 4}$$

where a represents a maximum outer diameter of the stator 110, b represents a minimum inner diameter of the stator 110, c represents a maximum outer diameter of the rotor 120, d represents a minimum inner diameter of the rotor 120, and $(c^2-d^2)/(a^2-b^2)$ represents a ratio (Ar/As) of a rotor area to a stator area.

Meanwhile, the maximum outer diameter of the stator 110 may be in the range of 15 mm to 280 mm. If the maximum outer diameter of the stator 110 is smaller than 15 mm, namely if the resolver 100 has an excessively small size, interference is generated between magnetic fluxes respectively generated at the teeth 114 of the stator 110, and thus the area ratio may not be easily optimized using Equation 4. In addition, if the maximum outer diameter of the stator 110 is greater than 280 mm, namely if the resolver 100 has an excessively great size, an error is increased while approximating the areas of the stator 110 and the rotor 120, and thus the area ratio may not be easily optimized using Equation 4.

Hereinafter, the measurement performance of the resolver according to the area ratio (Ar/As) between the stator and the rotor will be verified using an experimental example as follows.

Figure 2:
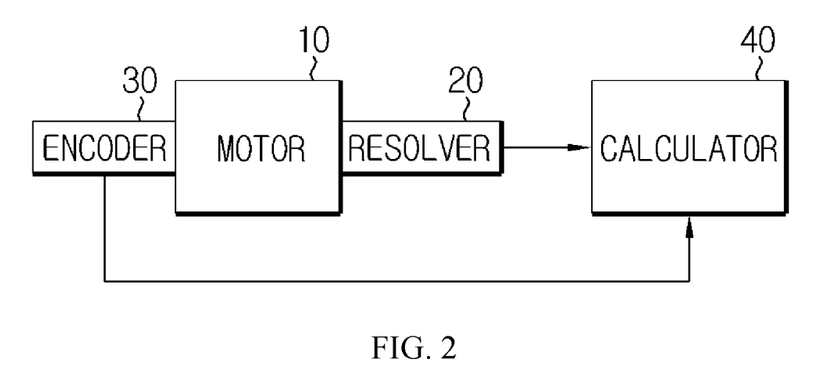
FIG. 2 shows an experiment environment of a resolver according to an embodiment of the present disclosure.

FIG. 2 shows an experiment environment of a resolver according to an embodiment of the present disclosure.

As shown in FIG. 2, in this experimental example, a resolver sample 20 according to an embodiment of the present disclosure was coupled to one end of a rotary shaft of a motor 10, also an encoder 30 was coupled to the other end of the rotary shaft of the motor 10, and then output waveforms of the resolver sample 20 and the encoder 30 were analyzed by means of a calculator 40 to measure an error of the resolver sample 20.

Preparation of a Resolver Sample

A plurality of resolver samples including a stator with an outer diameter in the range of 15 mm to 280 mm and designed to have an area ratio (Ar/As) between the stator and the rotor in the range of 5% to 46% were prepared. The stator and the rotor of each sample were prepared by laminating ferromagnetic steel plates with a thickness of 0.5 mm in order to minimize a loss such as an iron loss. In addition, the stator was prepared to have 24 teeth, and the rotor was prepared to have 10 salient poles.

Measurement of Errors

Experiment conditions were set have an experiment temperature of 24.5° C., an applied voltage of 7 Vrms, a frequency of 10 kHz, and a rotation speed of 60 rpm at the rotor, and other experiment conditions than the area ratio (Ar/As) were maintained consistently among the resolver sample. While driving the rotary shaft of the motor 10, a rotation angle profile of the resolver sample 20 was calculated by means of the calculator 40, and the rotation angle profile of the resolver sample 20 was compared with a rotation angle profile of the encoder 30 to calculate a measurement error of each sample. In addition, a maximum allowable error of the resolver aimed in this experimental example was set to be ±0.5°. The resolver having measurement performance satisfying the maximum allowable error of ±0.5° may be applied to various precise control systems, thereby ensuring versatile application together with measurement precision.

FIGS. 3a, 3b, 3c, 3d, 3e and 3f are graphs schematically showing a measurement error according to an area ratio between a stator and a rotor.

Figure 3A:
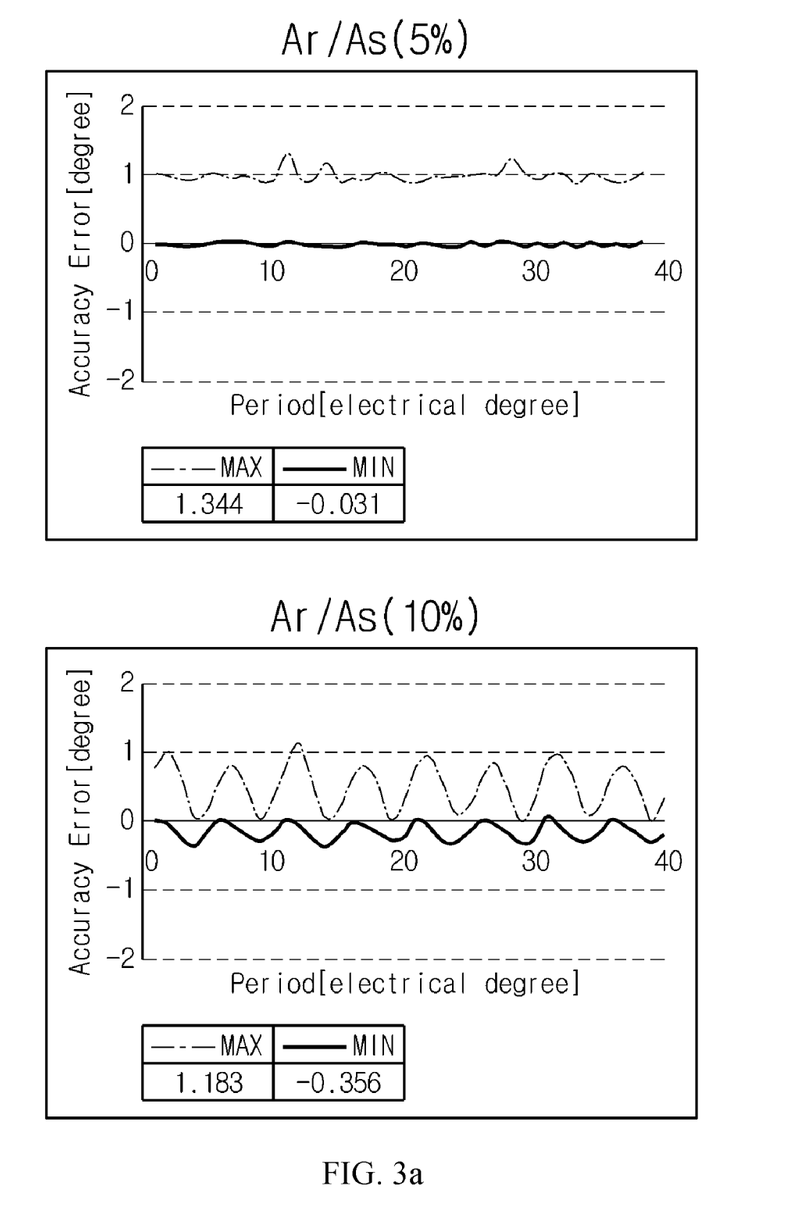
FIGS. 3a, 3b, 3c, 3d, 3e and 3f are graphs schematically showing a measurement error according to an area ratio between a stator and a rotor.
Figure 3B:
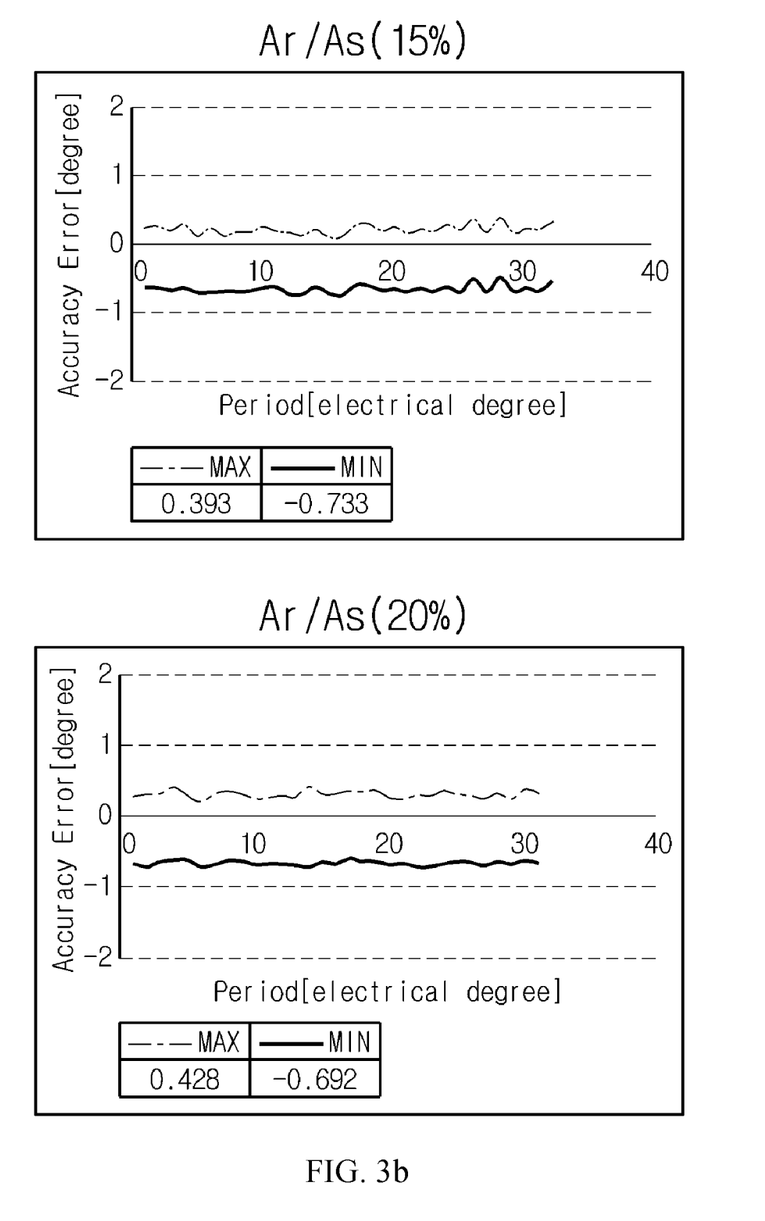
Figure 3C:
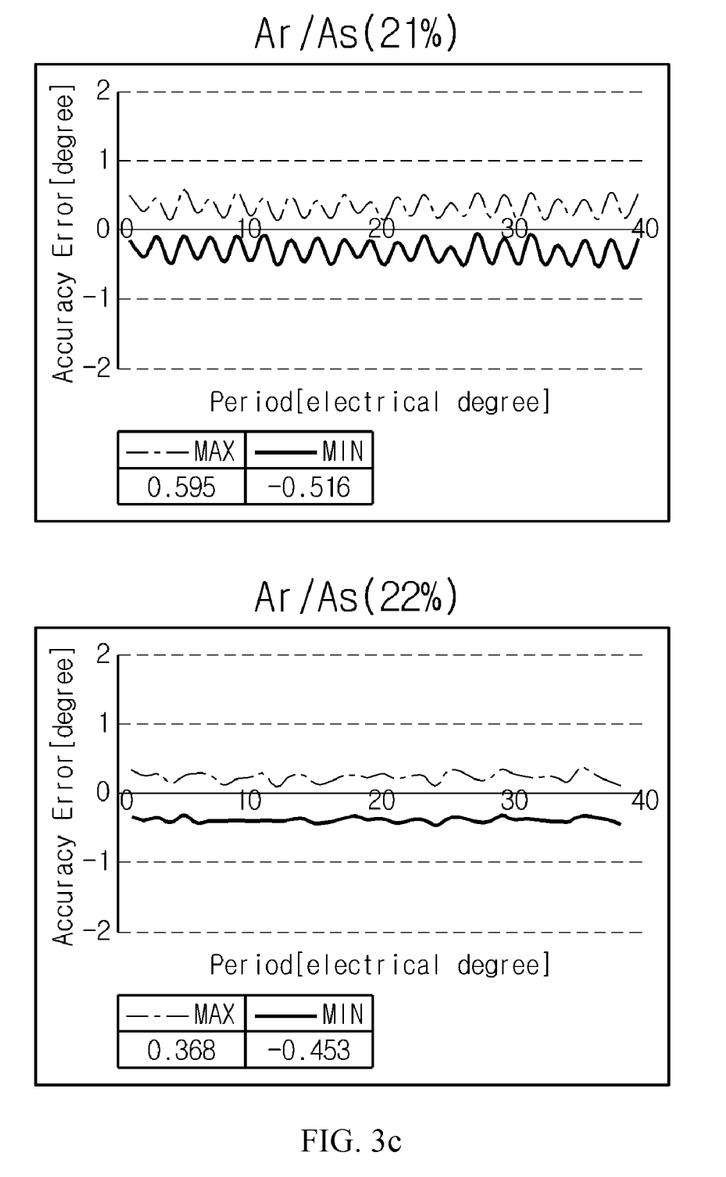
Figure 3D:
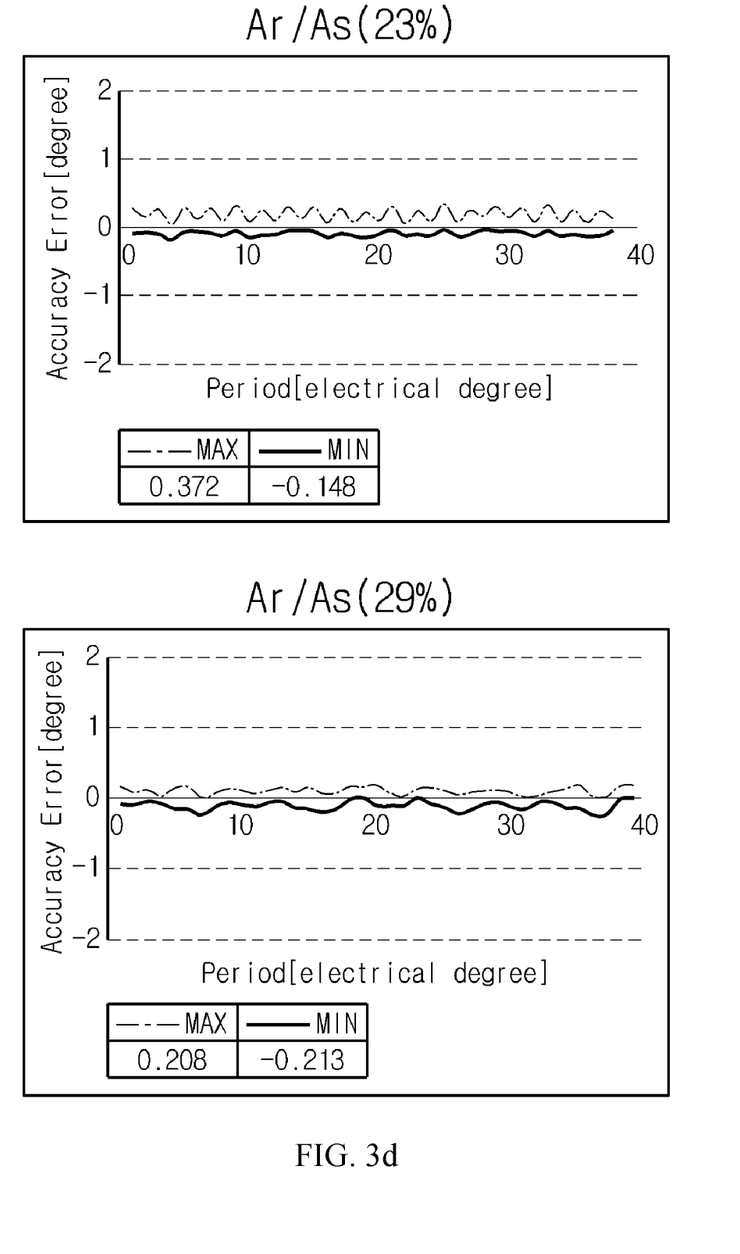
Figure 3E:
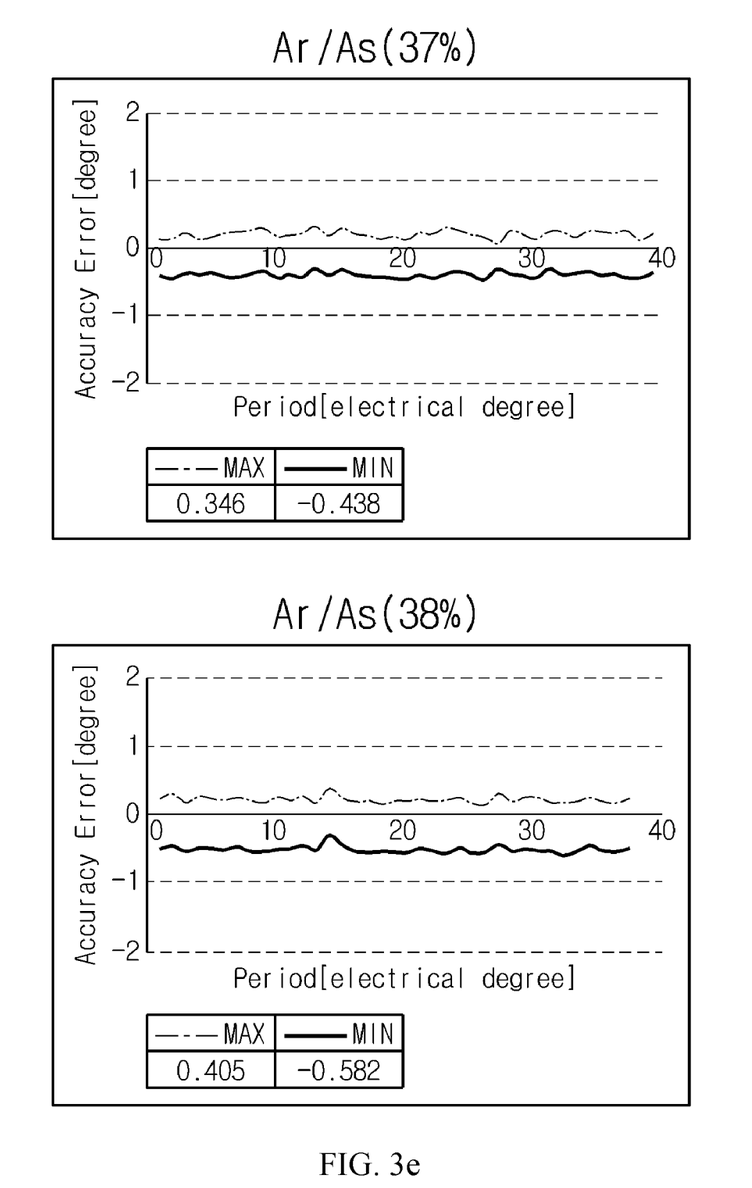
Figure 3F:
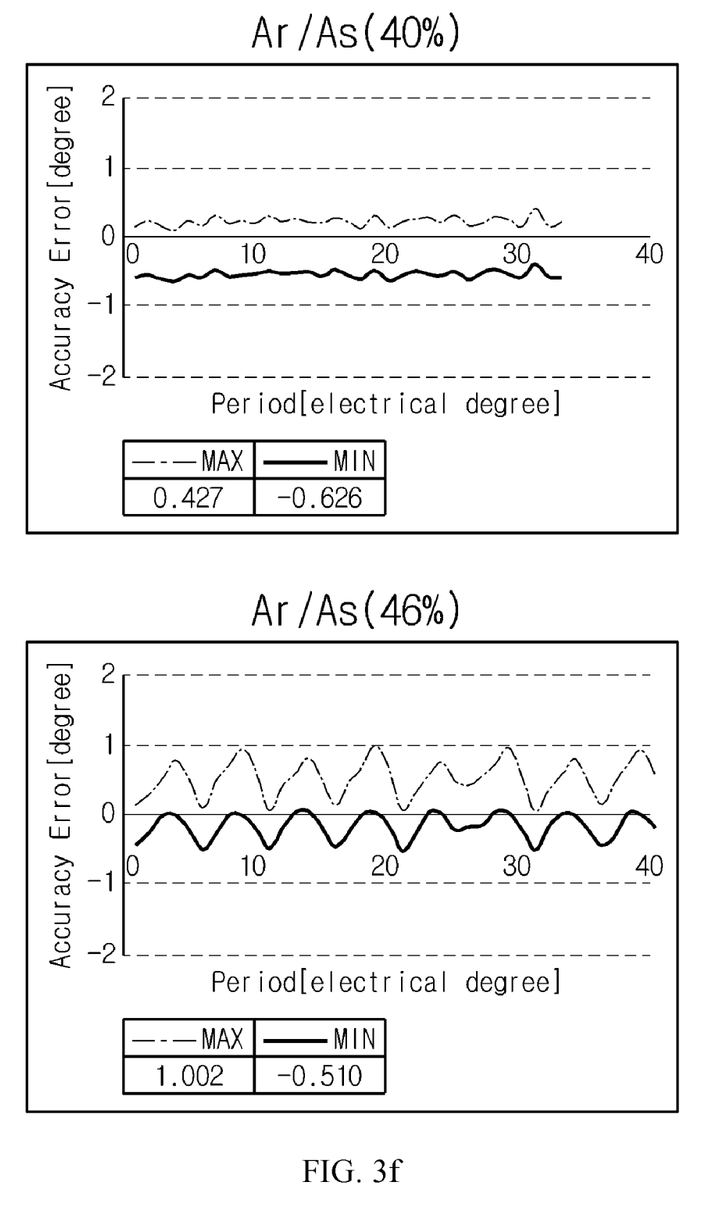

Referring to FIGS. 3a, 3b and 3c, it may be found that if the area ratio (Ar/As) of the rotor to the stator is 5%, as the rotor keeps rotating, a measurement error varies between a maximum value of 1.344° and a minimum value of −0.031°, and the maximum measurement error which is an absolute value is 1.344°. In addition, it may be found that as the area ratio (Ar/As) increases to 5%, 10%, 15%, 20%, and 21%, the maximum measurement error gradually decreases to 1.344°, 1.183°, 0.733°, 0.692°, and 0.595°, and when the area ratio (Ar/As) comes to 22%, the maximum measurement error becomes 0.453°, which is lower than the maximum allowable error of 0.5°.

In addition, referring to FIGS. 3a, 3b, 3c, 3d, 3e and 3f, it may be found that as the area ratio (Ar/As) of the rotor to the stator increases from 23% to 29%, the maximum measurement error decreases from 0.372° to 0.213° and thus reaches a minimum point, and then, if the area ratio (Ar/As) increases up to 37%, the maximum measurement error increases to 0.483°. In addition, it may be found that if the area ratio (Ar/As) further increases to reach 38%, 40%, and 46%, the maximum measurement error increases to 0.582°, 0.626°, 1.002°, respectively, beyond the allowable error range.

Figure 4:
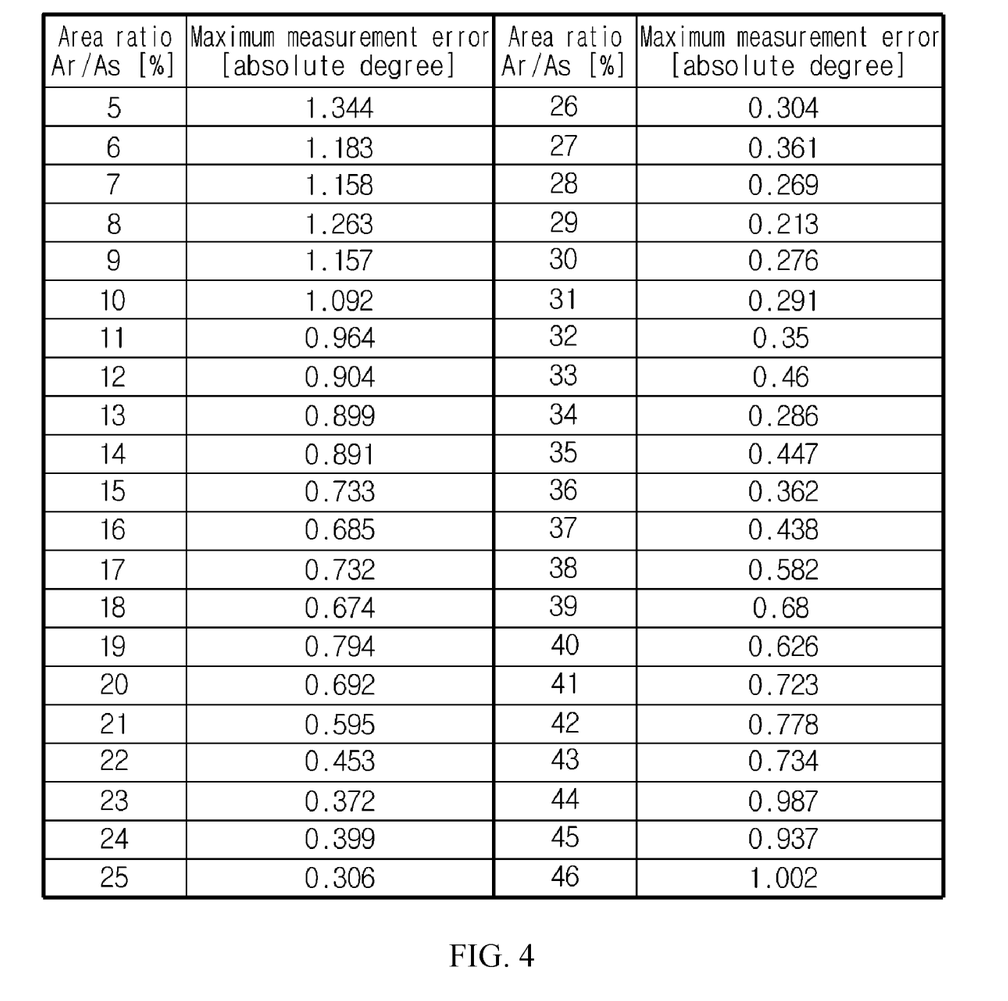
FIG. 4 is a table showing a maximum measurement error according to an area ratio between the stator and the rotor.

FIG. 4 is a table showing a maximum measurement error according to an area ratio between the stator and the rotor.

Figure 5:
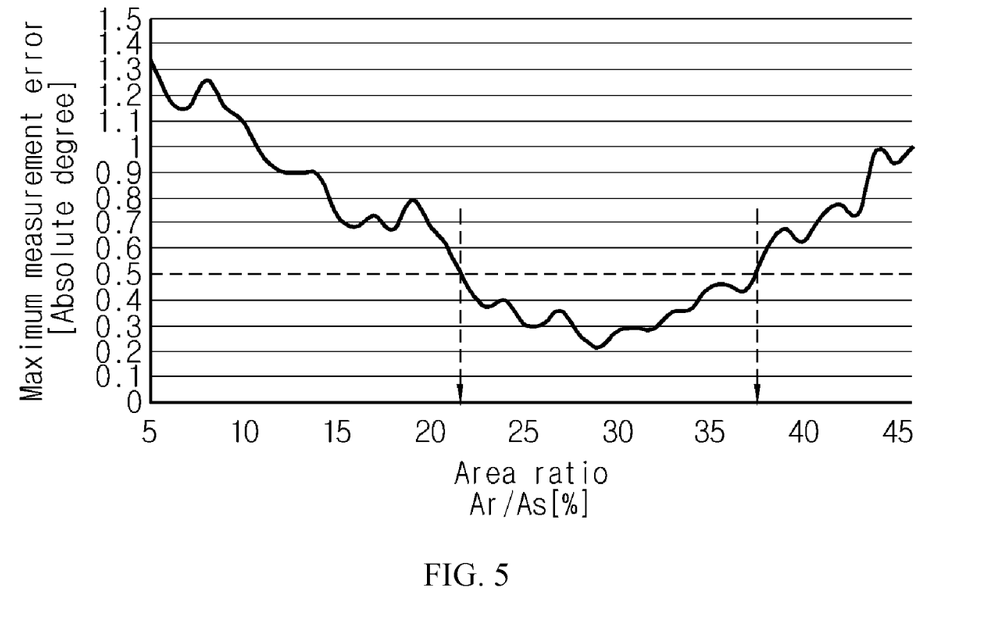
FIG. 5 is a graph showing a trend of change of the maximum measurement error according to an area ratio between the stator and the rotor.

FIG. 5 is a graph showing a trend of change of the maximum measurement error according to an area ratio between the stator and the rotor.

Referring to FIGS. 4 and 5, if the area ratio (Ar/As) of the rotor to the stator gradually increases from 5% to 46%, the maximum measurement error of the resolver generally decreases and then increases again. In other words, if the area ratio (Ar/As) increases from 5% to 21%, the maximum measurement error of the resolver generally decreases but does not satisfy the allowable error range. Meanwhile, if the area ratio (Ar/As) is in the range of 22% to 37%, the maximum measurement error of the resolver satisfies the allowable error range. However, if the area ratio (Ar/As) further increases greater than 37%, the maximum measurement error of the resolver does not satisfy the allowable error range.

As described above, according to the present disclosure, since an area relation between a stator and a rotor is optimized in designing a resolver, it is possible to prevent magnetic saturation of the resolver, improve measurement precision and reduce manufacture costs without unnecessarily increasing a size or weight of the resolver. In addition, since an area of the stator and an area of the rotor are calculated as approximate values and a numerical range for optimizing an area ratio between the stator and the rotor is provided to be reflected on the design of the resolver, it is possible to facilitate a design work for the resolver and prevent a design error. Further, the embodiments according to the present disclosure can also solve not only the technical object of the present disclosure but also various technical objects not mentioned herein.

Heretofore, the embodiments of the present disclosure have been described in detail. However, it will be clearly understood by those skilled in the art that various modifications can be made within the scope of the present disclosure. Therefore, the embodiments should not be interpreted restrictively but illustrative. In other words, the true scope of the present disclosure is defined in the appended claims, and its equivalents and modifications should be entirely considered as falling within the scope of the present disclosure.

What is claimed is:

1. A resolver, which includes a stator having at least one excitation coil and at least one output coil, and a rotor disposed at a center space in the stator with a predetermined gap from the stator, the rotor rotating based on a rotary shaft to change a gap permeance with respect to the stator, wherein an area ratio (Ar/As) between the stator and the rotor satisfies Equation 1 below:

$$0.22 \leq Ar/As \leq 0.37 \qquad \text{Equation 1}$$

where As represents a sectional area of the stator, and Ar represents a sectional area of the rotor, and wherein the stator has a ring shape, and the maximum outer diameter of the stator is in the range of 15 mm to 280 mm, and wherein the sectional area (As) of the stator is defined using Equation 2 below:

$$As = \pi(a/2)^2 - \pi(b/2)^2 \qquad \text{Equation 2}$$

where As represents the sectional area of the stator, a represents the maximum outer diameter of the stator, and b represents a minimum inner diameter of the stator, and wherein the sectional area (Ar) of the rotor is defined using Equation 3 below:

$$Ar = \pi(c/2)^2 - \pi(d/2)^2 \qquad \text{Equation 3}$$

where Ar represents the sectional area of the rotor, c represents a maximum outer diameter of the rotor, and d represents a minimum inner diameter of the rotor.

2. The resolver according to claim 1, wherein the stator includes a back yoke having a ring-shaped body, and a plurality of teeth and a plurality of slots alternately formed at an inner circumference of the back yoke, and wherein the excitation coil or the output coil is wound on the teeth and accommodated in the slots.

3. The resolver according to claim 2, wherein the teeth respectively include a front end having a T shape, and a support portion protruding on the inner circumference of the back yoke to support the front end, the excitation coil or the output coil being wound on the support portion.

4. The resolver according to claim 2, wherein the maximum outer diameter (a) of the stator is defined as an outer diameter of the back yoke, and wherein the minimum inner diameter (b) of the stator is defined as a diameter of a circle formed by connecting terminals of the plurality of teeth.

5. The resolver according to claim 1, wherein the rotor includes a ring-shaped body having a center hole into which the rotary shaft is inserted, and a plurality of salient poles formed at an outer circumference of the ring-shaped body.

6. The resolver according to claim 5, wherein the salient pole has an arc shape with a curvature radius smaller than at least a curvature radius of the rotor.

7. The resolver according to claim 6, wherein the maximum outer diameter (c) of the rotor is defined as a diameter of a circle formed by connecting peak points of the plurality of salient poles, and wherein the minimum inner diameter (d) of the rotor is defined as a diameter of the center hole.

8. The resolver according to claim 7, wherein the rotor or the stator is a steel plate laminate formed by laminating magnetic steel plates of a predetermined thickness.

9. The resolver according to claim 8, wherein the rotor is compressively inserted into an end of a shaft of a motor assembled to an electric power steering device.

* * * * *